United States Patent
Kravitz et al.

(10) Patent No.: US 10,866,178 B2
(45) Date of Patent: Dec. 15, 2020

(54) VIBRATORY CAVITY DENSITY METER

(71) Applicant: Micro Motion, Inc., Boulder, CO (US)

(72) Inventors: Andrew S. Kravitz, Frederick, CO (US); Martin Andrew Schlosser, Boulder, CO (US); Mark James Bell, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 49 days.

(21) Appl. No.: 16/303,480

(22) PCT Filed: Jun. 13, 2016

(86) PCT No.: PCT/US2016/037230
§ 371 (c)(1),
(2) Date: Nov. 20, 2018

(87) PCT Pub. No.: WO2017/217968
PCT Pub. Date: Dec. 12, 2017

(65) Prior Publication Data
US 2020/0064244 A1    Feb. 27, 2020

(51) Int. Cl.
*G01N 9/00* (2006.01)

(52) U.S. Cl.
CPC ....... *G01N 9/002* (2013.01); *G01N 2009/004* (2013.01); *G01N 2009/006* (2013.01)

(58) Field of Classification Search
CPC .................. G01N 2009/004; G01N 2009/006
USPC .......................................................... 73/32 A
See application file for complete search history.

(56) References Cited

U.S. PATENT DOCUMENTS

2016/0123861 A1    5/2016 Scheibelmasser et al.

FOREIGN PATENT DOCUMENTS

| DE | 102005044930 B3 | 6/2007 |
| JP | H06034414 A | 2/1994 |

*Primary Examiner* — John Fitzgerald
*Assistant Examiner* — Rodney T Frank
(74) *Attorney, Agent, or Firm* — The Ollila Law Group LLC

(57) ABSTRACT

A vibratory cavity density meter (100-300) is provided. The vibratory cavity density meter (100-300) includes a pipe (110-310) extending from a first end (110a-310a) to a second end (110b-310b). The first end (110a-310a) includes an aperture (114-314) configured to receive a material from a container (10) and the second end (110b-310b) is self-enclosed so as to contain the material in the pipe (110-310). The vibratory cavity density meter (100-300) also includes at least one transducer (118, 218) coupled to the pipe (110-310), the at least one transducer (118, 218) configured to one of induce and sense a vibration in the pipe (110-310) to measure a property of the material.

15 Claims, 7 Drawing Sheets

VIBRATORY CAVITY DENSITY METER

TECHNICAL FIELD

The embodiments described below relate to vibratory sensors and, more particularly, to a vibratory cavity density meter.

BACKGROUND

There are several different types of vibratory meters that measure a density of a fluid. Each type of density meter has advantages and disadvantages that are usually inherent in the design. One type of density meter uses one or more tubes, such as a dual tube Coriolis meter, to measure density. Tube density meters that measure a density are typically more accurate that other density meters presently available. The tube density meter also tends to be immune or at least capable of handling most process condition effects due to having a very high quality (or damping) factor Q even when the process material is extremely viscous. However, the tube density meter may also necessarily be used as a bypass device in any application outside of its designated size range. In addition, the tube density meter may also require that the process material be flowing to cycle material through the meter. This can make the meter somewhat difficult to integrate into many systems, particularly when looking to measure the density of a fluid in a tank.

Another type of density meter is a fork meter, which looks similar to a tuning fork, to measure density. The fork meter is inserted directly into the process material, whether it is in a bypass loop, directly in a tank, directly or slightly recessed into a flow tube, or any number of other possible installation types. The flexibility of the fork meter is its major attribute, as it can be used in a number of applications where other measurement technologies are prohibitively expensive or difficult to install other types of vibratory meters. The fork meter is very sensitive to unstable process conditions, such as high viscosities, flow rates, and multiphase fluids.

While both the tube and fork density meters operate on the principle of using the natural frequency of a vibrating member to measure process material, they differ in how the material and sensor interact. The tube density meter operates by filling one or more tubes with process material and measuring the natural frequency of the resulting system to measure density. The fork meter vibrates the tines of the fork, which is located directly in the process material.

A difference between these two methods is the fork meter has a significantly higher level of damping on the measurement due to being immersed in process material rather than being filled by the material. The extra damping seen by the fork meter is one of the reasons why the fork meter is so sensitive to process conditions and less accurate than the tube meter. Accordingly, there is a need for a vibratory meter that measures the density of a fluid, without some of the disadvantages of available vibratory meters, such as the vibratory cavity density meter described in the following.

SUMMARY

A vibratory cavity density meter is provided. According to an embodiment, the vibratory cavity density meter comprises a pipe extending from a first end to a second end. The first end includes an aperture configured to receive a material from a container and the second end is self-enclosed so as to contain the material in the pipe. The vibratory cavity density meter also includes at least one transducer coupled to the pipe. The at least one transducer is configured to one of induce and sense a vibration in the pipe to measure a property of the material.

A method of operating a vibratory cavity density meter is provided. According to an embodiment, the method of operating a vibratory cavity density meter comprises providing a pipe extending from a first end to a second end, receiving a material from a container through an aperture at the first end, retaining the material in the pipe with the second end, the second end being self-enclosed, and vibrating the pipe to measure a property of the material.

A vibratory cavity density meter is provided. According to an embodiment, the vibratory cavity density meter comprises a pipe extending from a first end to a second end. The first end includes an aperture configured to receive a material from a container and the second end is self-enclosed so as to contain the material in the pipe. The system also includes a meter electronics communicatively coupled to the vibratory cavity density meter, the meter electronics being configured to vibrate the pipe to measure a property of the material.

ASPECTS

According to an aspect, a vibratory cavity density meter (100-300) comprises a pipe (110-310) extending from a first end (110a-310a) to a second end (110b-310b), wherein the first end (110a-310a) includes an aperture (114-314) configured to receive a material from a container (10) and the second end (110b-310b) is self-enclosed so as to contain the material in the pipe (110-310). The vibratory cavity density meter (100-300) also includes at least one transducer (118, 218) coupled to the pipe (110-310), the at least one transducer (118, 218) configured to one of induce and sense a vibration in the pipe (110-310) to measure a property of the material.

Preferably, the pipe (110-310) extends from the container (10) in a cantilever configuration such that the first end (110a-310a) is vibrationally fixed and the second end (110b-310b) is vibrationally free.

Preferably, the at least one transducer (118, 218) is disposed proximate to the second end (110b-310b).

Preferably, the vibratory cavity density meter (100-300) further comprises an encapsulating tube (20) wherein the at least one transducer (118) is disposed between and coupled to the pipe (110, 310) and the encapsulating tube (20).

Preferably, the vibratory cavity density meter (200) further comprises a second pipe (220), wherein the at least one transducer (218) is disposed between and coupled to the pipe (210) and the second pipe (220).

Preferably, the vibratory cavity density meter (100-300) further comprises a base (130, 230) disposed between and coupled to the container (10) and the pipe (110-310).

Preferably, the vibratory cavity density meter (300) further comprises a cavity (302) formed in the pipe (310), wherein the cavity (302) includes a slope configured to drain the material into the container (10).

According to an aspect, a method of operating a vibratory cavity density meter comprises providing a pipe extending from a first end to a second end, receiving a material from a container through an aperture at the first end, retaining the material in the pipe with the second end, the second end being self-enclosed, and vibrating the pipe to measure a property of the material.

Preferably, providing the pipe extending from the first end to the second end comprises providing the pipe in a cantilever configuration such that the first end is vibrationally fixed and the second end is vibrationally free.

Preferably, vibrating the pipe to measure the property of the material comprises vibrating the second end of the pipe with at least one transducer disposed proximate the second end of the pipe.

Preferably, vibrating the pipe to measure the property of the material comprises vibrating the pipe with at least one transducer disposed between and coupled to the pipe and an encapsulating tube.

Preferably, the method further comprises providing a second pipe, and disposing at least one transducer between the pipe and the second pipe.

Preferably, the method further comprises disposing a base between and coupled to the container and the pipe.

Preferably, the method further comprises forming a cavity in the pipe, wherein the cavity includes a slope configured to drain the material into the container.

According to an aspect, a system (700) comprises a vibratory cavity density meter (100-300) comprised of a pipe (110-310) extending from a first end (110a-310a) to a second end (110b-310b), wherein the first end (110a-310a) includes an aperture (114-214) configured to receive a material from a container (10) and the second end (110b-310b) is self-enclosed so as to contain the material in the pipe (110-310). The system (700) also includes a meter electronics (710) communicatively coupled to the vibratory cavity density meter (100-300), the meter electronics (710) being configured to vibrate the pipe (110-310) to measure a property of the material.

BRIEF DESCRIPTION OF THE DRAWINGS

The same reference number represents the same element on all drawings. It should be understood that the drawings are not necessarily to scale.

DETAILED DESCRIPTION

FIGS. 1-8 and the following description depict specific examples to teach those skilled in the art how to make and use the best mode of embodiments of a vibratory cavity density meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the vibratory cavity density meter. As a result, the embodiments described below are not limited to the specific examples described below, but only by the claims and their equivalents.

The vibratory cavity density meter includes a pipe extending from a first end to a second end. The first end includes an aperture configured to receive a material from a container. The second end is self-enclosed so as to contain the material in the pipe. At least one transducer is coupled to the pipe. The at least one transducer is configured to induce or sense a vibration in the pipe to measure a property of the material. The pipe is configured to vibrate at a natural frequency f of the pipe and the material retained in the pipe. Accordingly, the property of the material may be measured without bypassing the container, unlike a tube density meter employed outside its designated size range. As a result, the vibratory cavity density meter designed to measure a material may be employed with a variety of containers having different sizes and configurations and with or without fluid flows.

Figure 1:
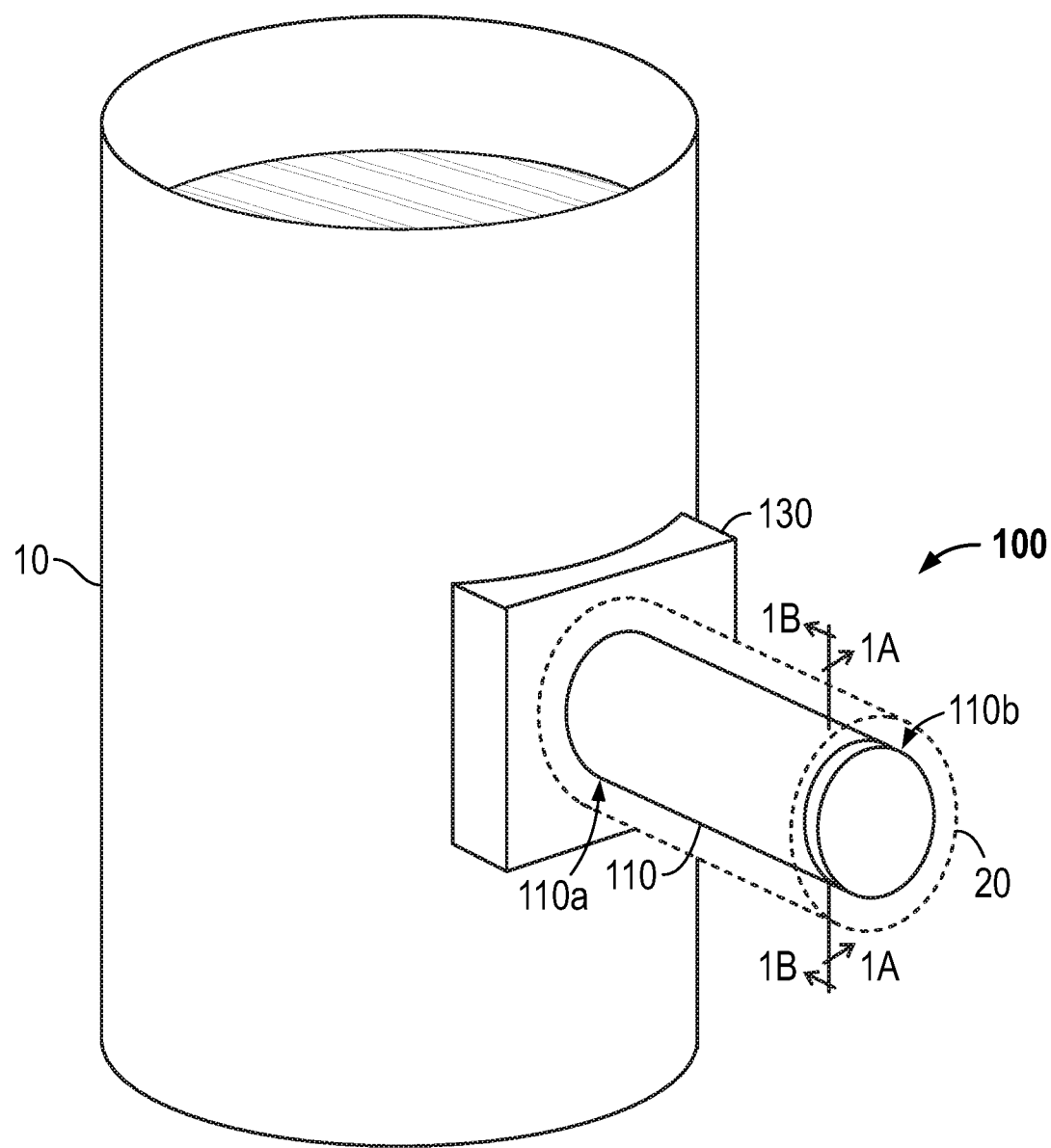
FIG. 1 shows a vibratory cavity density meter 100 according to an embodiment.

FIG. 1 shows a vibratory cavity density meter 100 according to an embodiment. As shown in FIG. 1, the vibratory cavity density meter 100 is coupled to a container 10. The container 10 is filled with a material, such as a fluid, to be measured by the vibratory cavity density meter 100. As shown in FIG. 1, the vibratory cavity density meter 100 includes a pipe 110. The pipe 110 is coupled to a base 130, which is coupled to the container 10. As shown, the base 130 is affixed to an outer wall of the container 10. The pipe 110 is surrounded by an encapsulating tube 20, which is also coupled to the container 10 via the base 130. For clarity, transducers are not shown, but will be described with reference to FIG. 1A.

The container 10 is shown as a cylinder holding the material, which is not flowing. However, in alternative embodiments, the container 10 may be a conduit, or the like, through which the material flows. Additionally or alternatively, the container 10 may have different shapes, such as, for example, rectangular, oval, triangular or the like. Also as shown, the container 10 is shown with a single opening in the top. However, for example, in conduits with fluid flow, the container 10 may include additional openings, such as an opening in the bottom of the container. The additional openings may also include orifices in the outer wall of the container, additional conduits, etc.

The encapsulating tube 20 is shown as a substantial concentric tube. The encapsulating tube 20 may need to have sufficient stiffness or rigidity such that when there is excitation between the pipe 110 and the encapsulating tube 20, the vibratory cavity density meter 100 vibrates more than the encapsulating tube 20. Accordingly, a driver, which is described in more detail in the following with reference to FIGS. 1A and 1B, tends to vibrate the vibratory cavity density meter 100 more than the encapsulating tube 20, resulting in measurable vibrations. The stiffness or rigidity of the encapsulating tube 20 may be some number greater than the pipe 110.

The base 130 may be a flange or the like that is configured to couple to the container by any suitable means, such as welding, brazing, removable means (e.g., bolts, screws, etc.), or the like. The base 130 may also include a gasket, or other materials. The base 130 is shown as having a square shape with a complementary surface that fits against the container, although any suitable shape and surfaces may be employed in alternative embodiments.

The vibratory cavity density meter 100 is shown as extending in a perpendicular direction from the outer wall of the container 10. The vibratory cavity density meter 100 is also shown as being affixed to the container with the base 130. However, in other embodiments, the vibratory cavity density meter 100 may extend in alternative directions and/or may not include the base 130. The vibratory cavity density meter 100 may also be affixed to alternative locations on the container 10. The pipe 110 is shown as being a cylinder that extends from a first end 110a to a second end 110b. The first end 110a includes an aperture configured to allow the material to fill the pipe 110, which is described in more detail with reference to FIG. 1A. The second end 110b is configured to displace in a transverse direction relative to the base 130 when the pipe 110 is vibrated. The second end 110b displaces due to elastic deformation of the pipe 110. The pipe 110 vibrates at a natural frequency that is based on the parameters of the pipe 110 and the material within the pipe 110. Accordingly, since the parameters of the pipe 110 are known, properties of the material in the pipe 110 may be determined by measuring the resonance frequency of the pipe 110.

Figure 1A:
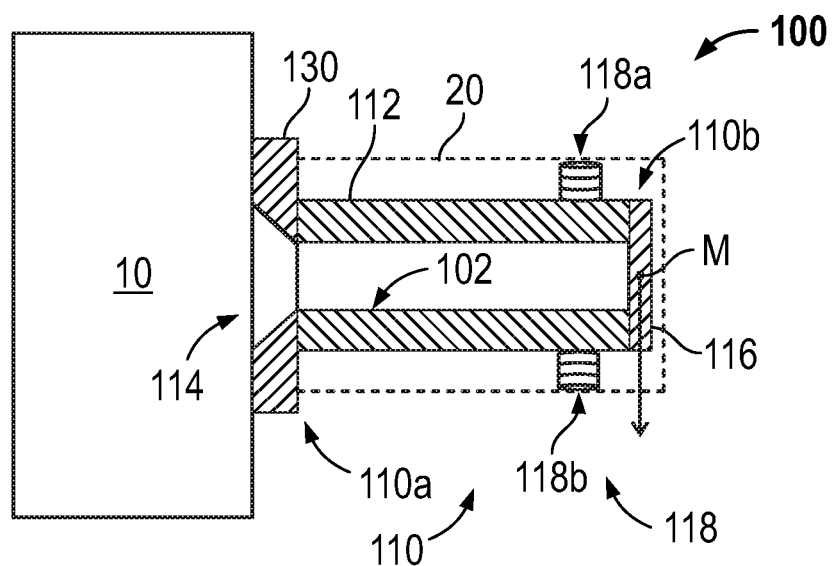
FIG. 1A shows a cross-sectional view of the vibratory cavity density meter 100.

FIG. 1A shows a cross-sectional view of the vibratory cavity density meter 100. As shown in FIG. 1A, the vibratory cavity density meter 100 includes the pipe 110 and the base 130. The pipe 110 includes the first end 110a and the second end 110b that are respectively proximate to and distal from the container 10. The pipe 110 includes a conduit 112 with a proximal end that is coupled to the base 130 at the first end 110a. The conduit 112 and base 130 form an aperture 114 that exposes the inner portion of the conduit 112 to the material in the container 10. The pipe 110 also includes an end cap 116 at the second end 110b that is coupled to a distal end of the conduit 112. At least one transducer 118 is coupled to the conduit 112 and the encapsulating tube 20. As shown in FIG. 1A, the at least one transducer 118 is comprised of a driver 118a and a pick-off sensor 118b that are coupled to the conduit 112 proximate the distal end of the conduit 112. As can be appreciated, the conduit 112 and end cap 116 form a cavity 102.

Figure 1B:
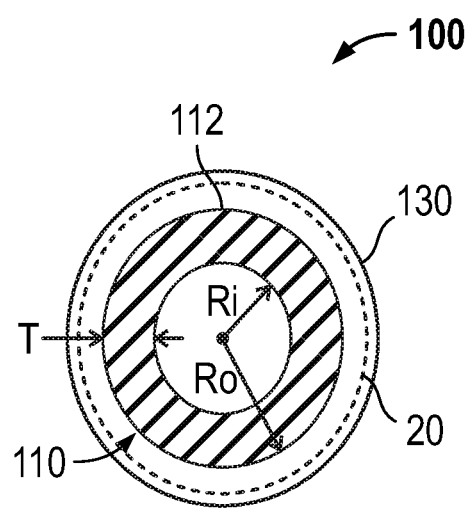
FIG. 1B shows another cross-sectional view of the vibratory cavity density meter 100 shown in FIG. 1.

FIG. 1B shows another cross-sectional view of the vibratory cavity density meter 100 shown in FIG. 1. The container 10, encapsulating tube 20, at least one transducer 118, and base 130 are not shown for clarity. As shown in FIG. 1B, the vibratory cavity density meter 100 includes dimensions of an inner radius ri and an outer radius ro of the pipe 110. A thickness T of the pipe 110 is the difference between the outer radius ro and the inner radius ri of the pipe 110. As can be appreciated, a natural frequency f of the vibratory cavity density meter 100 is correlated with the parameters of the conduit 112 as well as the properties of the material in the pipe 110. An exemplary model that can be used to determine the natural frequency f of the vibratory cavity density meter 100 is discussed in the following.

The following Table 1 lists parameters of the pipe 110 and the properties of the process material contained within the pipe 110 used in the exemplary mathematical model of the vibratory cavity density meter 100.

TABLE 1

| | Description of variables |
|---|---|
| f | Natural frequency of the vibratory cavity density meter |
| E | Elastic modulus of the conduit |

TABLE 1-continued

| | Description of variables |
|---|---|
| I | Cross-sectional moment of inertia of the cavity shape |
| μ | Mass per unit length of the cavity |
| L | Length of the cavity |
| M | Point mass at the end of the cavity (e.g., disk) |
| ro | Outer radius of the pipe |
| ri | Inner radius of the pipe |
| Dp | Density of the pipe material |
| Dm | Density of the process material |
| T | Thickness of the pipe and end disk (ro-ri) |

The properties of the process material contained in the vibratory cavity density meter 100 include the density of the process material Dm. As can be appreciated, the density of the process material Dm may be density of a single fluid component, net density of a mixture of fluid components, solids, and/or gases, etc., that comprise the process material.

As to the properties and parameters of the pipe 110, Table 1 includes the elastic modulus E of the pipe 110 and density of the pipe material Dp, inner and outer radius ri and ro, and length L of the cavity 102. The elastic modulus E is a property of the pipe 110 and can be defined as the ratio of stress and elastic strain of the pipe material. The density of the pipe material Dp is the mass per unit volume of the pipe material. The inner and outer radius ri, ro of the pipe 110 are the cross-sectional dimensions of the pipe 110 due to its circular shape. Other shapes (e.g., square, triangle, oval, rectangle, etc.) with other cross-sectional dimensions may be employed in alternative embodiments.

The foregoing properties and parameters of the pipe 110 and process material may be used to determine the natural frequency f of the vibratory cavity density meter 100 using the following equation (1):

$$f = \frac{1}{2\pi}\sqrt{\frac{3 \cdot E \cdot I}{(0.2234 \cdot \mu \cdot L + M) \cdot L^3}}. \tag{1}$$

As can be appreciated, other parameters listed in Table 1 need to be calculated to use the foregoing equation (1) to determine the natural frequency f of the vibratory cavity density meter 100, such as the cross-sectional moment of inertia I and mass per unit length μ of the pipe 110. As can be appreciated, other methods can be used to determine the natural frequency f rather than equation (1). For example, calibration methods or finite element analysis (FEA) methods can be employed.

The cross-sectional moment of inertia I may be determined using the following equation (2):

$$I = \frac{\pi}{4} \cdot (ro^4 - ri^4). \tag{2}$$

The cross-sectional moment of inertia I is related to the cross-sectional geometry of the conduit 112 and determines the torque needed for a desired angular acceleration about a rotational axis. The greater the cross-sectional moment of inertia I, the more torque needed to bend the conduit 112. The mass per unit length of the cavity μ can be determined from the following equation (3):

$$\mu = Dp \cdot \pi \cdot (ro^2 + ri^2) + Dm \cdot \pi \cdot ri^2. \tag{3}$$

Similarly, the point mass at the end of the cavity M also needs to be determined, which may be calculated using the following equation (4):

$$M = Dp \cdot T \cdot \pi \cdot ro^2. \qquad (4)$$

The mass per length of the cavity μ and point mass M at the end of the cavity indicates the amount of mass moving during vibration.

As can be appreciated, various materials and dimensions may be employed in alternative embodiments. In one exemplary embodiment, the pipe 110 may be a 2″ schedule 10 stainless steel pipe with a cavity 102 that is 6 inches long. In the following discussion, the pipe 110 is filled with air or water and the resulting natural frequency f is calculated, although the pipe 110 may be filled with any suitable material. Table 2 lists the values of parameters and properties of the pipe 110 filled with water or air.

TABLE 2

Exemplary material properties

| E | Steel elastic modulus | 10810464000 | [lb/in*s^2] |
|---|---|---|---|
| ro | Pipe outer radius | 1.1875 | [in] |
| ri | Pipe inner radius | 1.0785 | [in] |
| Dss | Density of steel | 0.289 | [lb/in^3] |
| Dair | Density of air/vacuum | 0 | [lb/in^3] |
| Dwat | Density of water | 0.03613 | [lb/in^3] |
| T | Pipe thickness | 0.109 | [in] |

Using the foregoing values, other parameters, such as the cross-sectional moment of inertia I may be calculated using equation (2), as the following calculation (5) illustrates:

$$I = \frac{\pi}{4} \cdot (1.1875^4 - 1.0785^4) = 0.499 \text{ in}^4. \qquad (5)$$

Similarly, the mass per unit length of the cavity μ filled with air and water can be calculated using equation (3), which is illustrated in the following calculations (6) and (7):

$$\text{Air } \mu = 0.289 \cdot \pi \cdot (1.1875^2 - 1.0875^2) = 0.224 \text{ lb/in} \qquad (6)$$

$$\text{Water } \mu = \qquad (7)$$
$$0.289 \cdot \pi \cdot (1.1875^2 + 1.0875^2) + 0.03613 \cdot \pi \cdot (1.0875^2) = 0.356 \text{ lb/in}$$

In addition, the point mass M at the end of the cavity 102 may also be calculated using the foregoing equation (4), as the following equation (8) illustrates:

$$M = 0.289 \cdot 0.109 \cdot \pi \cdot 1.1875^2 = 0.1396 \text{ lb}. \qquad (8)$$

Once equations (2)-(3) are determined, the natural frequency f of the vibratory cavity density meter 100 may be calculated using the equation (1), as the following calculations (9) and (10) illustrate:

$$\text{Air } f = \frac{1}{2\pi} \sqrt{\frac{3 \cdot 10810464000 \cdot 0.499}{(0.2235 \cdot 0.224 \cdot 6 + 0.1396) \cdot 6^3}} = 2076.9 \text{ Hz} \qquad (9)$$

$$\text{Water } f = \frac{1}{2\pi} \sqrt{\frac{3 \cdot 10810464000 \cdot 0.499}{(0.2235 \cdot 0.356 \cdot 6 + 0.1396) \cdot 6^3}} = 1753.8 \text{ Hz}. \qquad (10)$$

The calculations (9) and (10) show that only a single parameter (the mass per unit length μ) is different between the natural frequency f of a water filled or air filled cavity. This shows that it is possible to apply a calibrated linearization around the natural frequencies f of the vibratory cavity density meter 100 and use the linearization to measure the density of a given process material.

The foregoing discussion is of a single vibratory cavity density meter 100 vibrated in reference to a rigid outer surface. One possible alternative configuration is a matched pair of cavities vibrated differentially from each other, which may provide characteristics which are easier to balance. The mathematical analysis of the matched pair of cavities may be essentially the same as the single vibratory cavity density meter 100, assuming the matched pair of cavities are connected to a rigid surface. The following describes an exemplary matched pair of cavities.

Matched Pair of Cavities

Figure 2:
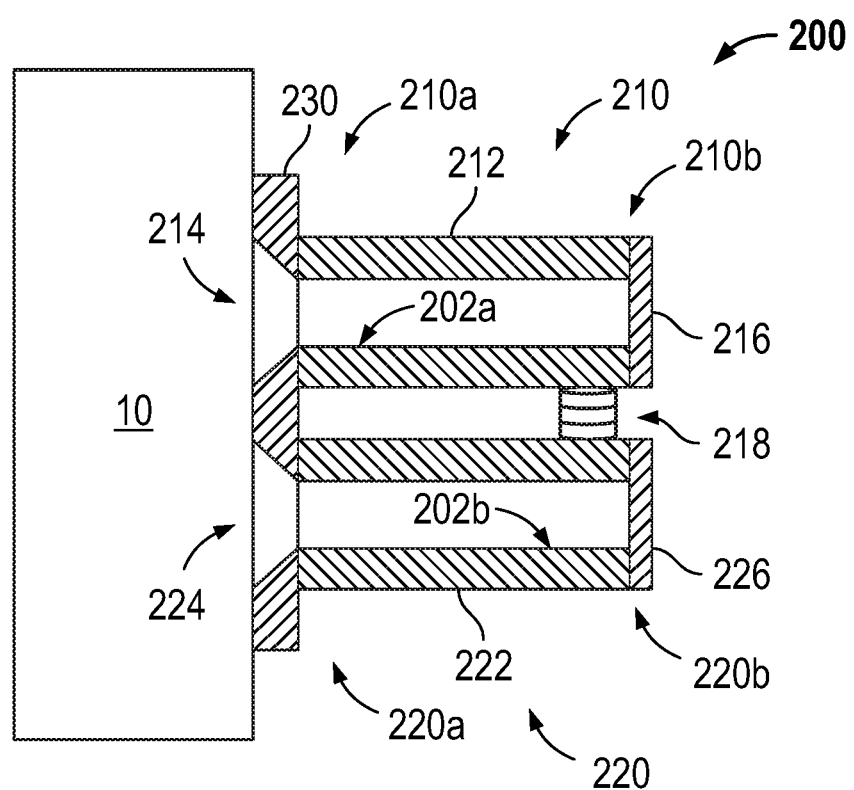
FIG. 2 shows a cross-sectional view of another vibratory cavity density meter 200 according to an embodiment.

FIG. 2 shows a cross-sectional view of another vibratory cavity density meter 200 according to an embodiment. As shown in FIG. 2, the vibratory cavity density meter 200 includes a first and second pipe 210, 220 and a base 230 similar to the pipe 110 and base 130 described in the foregoing with reference to FIG. 1. The first and second pipe 210, 220 respectively include a first end 210a, 220a and a second end 210b, 220b that are respectively proximate to and distal from the container 10. The first and second pipe 210, 220 also respectively include a first and second conduit 212, 222 with proximal ends that are coupled to the base 230 at the first ends 210a, 220a. The conduits 212, 222 and base 230 form a first and second aperture 214, 224 that exposes the inner portion of the conduits 212, 222 to the material in the container 10. The first and second pipe 210, 220 also include a first and second end cap 216, 226 at the second ends 210b, 220b that are coupled to distal ends of the conduits 212, 222. At least one transducer 218 is coupled to the conduits 212, 222 proximate the distal ends of the conduits 212, 222. The conduits 212, 222 and first and second end cap 216, 226 form a first and second cavity 202a, 202b.

As shown in FIG. 2, the vibratory cavity density meter 200 is a matched pair of pipes that are vibrated differentially. That is, the first pipe 210 and the second pipe 220 are driven differentially or in opposing directions. For example, the at least one transducer 218 may be a drive that, in a vibration cycle, can displace the second end 210b of the first pipe 210 in a first direction (e.g., upwards with respect to gravity) and the second end 220b of the second pipe 220 in a second direction that is opposite the first direction (e.g., downwards with respect to gravity). In addition to the foregoing configuration that employs two, rather than one, pipes 210, 220, embodiments can also include various cross sections, as the following discussion illustrates.

Sloped Cavity

Figure 3:
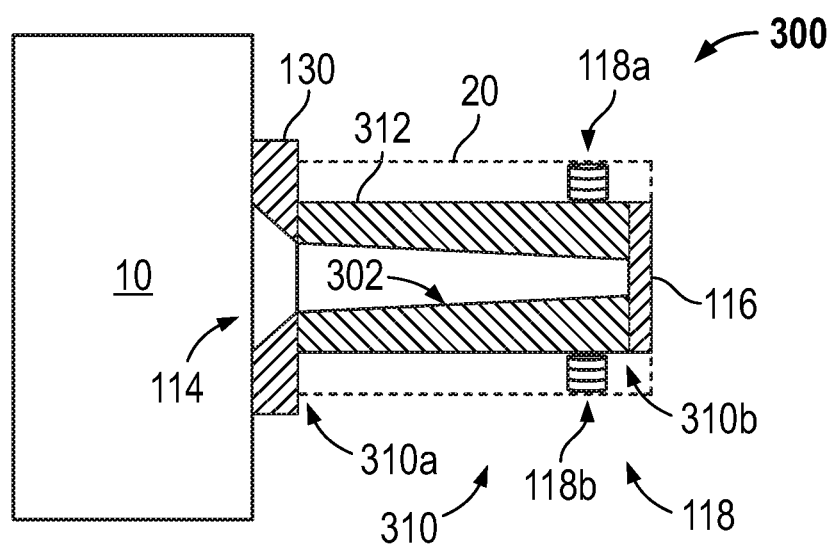
FIG. 3 shows a cross-sectional view of another vibratory cavity density meter 300 according to an embodiment.

FIG. 3 shows a cross-sectional view of another vibratory cavity density meter 300 according to an embodiment. As shown in FIG. 3, the vibratory cavity density meter 300 includes a pipe 310, which may be similar to the pipe 110 described with reference to FIG. 1. The pipe 310 shown in FIG. 3 includes a first end 310a and a second end 310b that are respectively proximate to and distal from the container 10. The pipe 310 includes a conduit 312 with a proximal end that is coupled to the base 130 at the first end 310a. The conduit 312 and base 130 form an aperture 114 that exposes the inner portion of the conduit 312 to the material in the container 10. The pipe 310 also includes an end cap 116 at the second end 310b that is coupled to a distal end of the conduit 312. The driver 118a and a pick-off sensor 118b described with reference to FIG. 1 are coupled to the conduit 312 proximate the distal end of the conduit 312. The conduit 312 and end cap 116 form a cavity 302.

The vibratory cavity density meter 300 shown in FIG. 3 differs from the vibratory cavity density meter 100 shown in FIG. 1 in that the cavity 302 has a conical shape with a slope in the upper and lower (with respect to gravity) portions. The upper portion of the cavity 302 slopes upwards from the second end 310b to the first end 310a. The lower portion of the cavity 302 slopes downwards from the second end 310b to the first end 310a.

Benefits may be realized due to the slope of a lower portion of the cavity 302. For example, as can be appreciated, the slope of the lower portion of the cavity 302 may cause the material in the vibratory cavity density meter 300 to flow into the container 10 when a level of the material in the container 10 drops below the vibratory cavity density meter 300. The slope may be beneficial in applications that, for example, employ a viscous material by decreasing the time required to calibrate the vibratory cavity density meter 300 with a calibration fluid, such as air, water, or the like. The slope may be optimized for various fluids (e.g., a greater slope may be employed for more viscous fluids). As can be appreciated, the calibration may be more accurate if, for example, the water used in calibration did not have a substantial amount of residual material in the vibratory cavity density meter 300.

Benefits may also be realized due to the slope of the upper portion of the cavity 302. For example, the slope of the upper portion of the cavity 302 may allow less dense fluids, such as air bubbles, to flow out of the cavity 302 and into the container 10 prior to measuring the material. That is, buoyancy causes the bubbles to not be present in the cavity 302. Accordingly, when the properties of the material are measured, the less dense fluid may not be in the vibratory cavity density meter 300, thereby ensuring that the measurement of the material's property is more accurate.

The pipes 110-310 in the vibratory cavity density meters 100-300 extend from the container 10. As shown in FIGS. 1-3, the pipes 110-310 extend from the container 10 from the first end 110a-310a to the second end 110b-310b in a cantilever configuration. Due to the cantilever configuration, the first end 110a-310a is vibrationally fixed and the second end 110b-310b is vibrationally free. For example, when the transducers 118, 218 vibrate the pipes 110-310, the first ends 110a-310a do not substantially vibrate whereas the second ends 110b-310b can vibrate.

The pipes 110-310 have circular cross sections. However, alternative cross sections may also include shapes that differ along their width and/or height. That is, the cross sections may also differ from an end view perspective of a vibratory cavity density meter. The following discussion illustrates several different exemplary cross-sectional shapes from the end view perspective.

Cross-Sections

Figure 4:
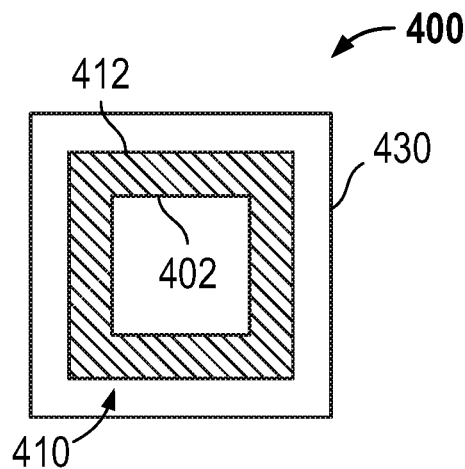
FIG. 4 shows a cross-sectional view of a vibratory cavity density meter 400 with a square cross section according to an embodiment.

FIG. 4 shows a cross-sectional view of a vibratory cavity density meter 400 with a square cross section according to an embodiment. As shown in FIG. 4, the vibratory cavity density meter 400 includes a pipe 410, which is coupled to a base 430. The pipe 410 is comprised of a conduit 412. The pipe 410 includes an aperture at a first end that is proximate a container and exposed to material in the container. Although not shown, the pipe 410 is also self-enclosed at a second end that is distal from the container. The container is not shown for clarity, but may be similar to the container 10 shown in FIG. 1. The pipe 410 including the aperture at the first end and being self-enclosed at the second end forms a cavity 402.

Figure 5:
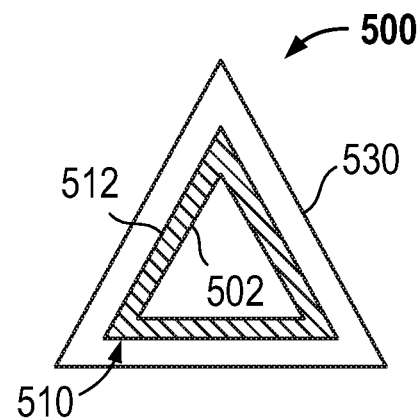
FIG. 5 shows a cross-sectional view of a vibratory cavity density meter 500 with a triangular cross section according to an embodiment.

FIG. 5 shows a cross-sectional view of a vibratory cavity density meter 500 with a triangular cross section according to an embodiment. As shown in FIG. 5, the vibratory cavity density meter 500 includes a pipe 510, which is coupled to a base 530. The pipe 510 is comprised of a conduit 512. The pipe 510 includes an aperture at a first end that is proximate a container and exposed to material in the container. Although not shown, the pipe 510 is also self-enclosed at a second end that is distal from the container. The container is not shown for clarity, but may be similar to the container 10 shown in FIG. 1. The pipe 510 including the aperture at the first end and being self-enclosed at the second end forms a cavity 502.

As discussed with reference to FIG. 1, the inner radius ri and outer radius ro of the circular cross-section is used to determine the various parameters of the pipe 110, such as the cross-sectional moment of inertia I. Due to differing cross-sectional shapes, such as a rectangular cross-section, alternative dimensions may be employed.

Figure 6:
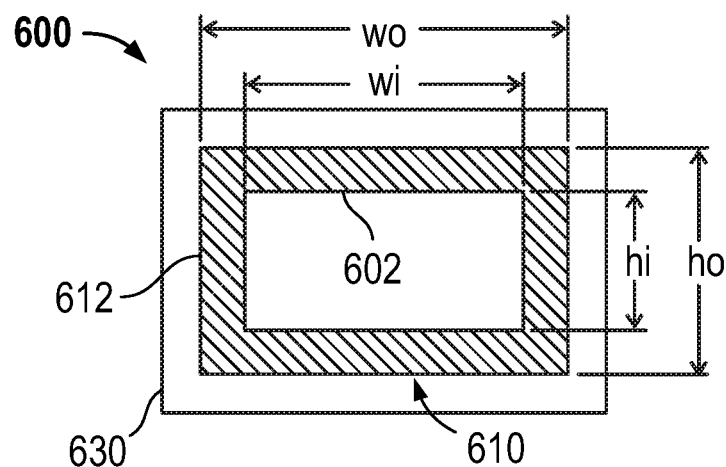
FIG. 6 shows a cross-sectional view of a vibratory cavity density meter 600 with a rectangular cross section according to an embodiment.

FIG. 6 shows a cross-sectional view of a vibratory cavity density meter 600 with a rectangular cross section according to an embodiment. As shown in FIG. 6, the vibratory cavity density meter 600 includes a pipe 610, which is coupled to a base 630. The pipe 610 is comprised of a conduit 612. The pipe 610 includes an aperture at a first end that is proximate a container and exposed to material in the container. Although not shown, the pipe 610 is also self-enclosed at a second end that is distal from the container. The container is not shown for clarity, but may be similar to the container 10 shown in FIG. 1. The pipe 610 including the aperture at the first end and being self-enclosed at the second end forms a cavity 602. Due to the rectangular cross-section, the dimensions of the pipe 610 are an inner and outer height hi, ho and an inner and outer width wi, wo, which are shown in the following Table 3.

TABLE 3

| Rectangular tube cross section dimensions | |
| --- | --- |
| ho | Outer wall height |
| hi | Inner wall height |
| wo | Outer wall width |
| wi | Inner wall width |

The cross-sectional moment of inertia I is determined using equation (11), which is different than equation (2) used for circular cross-sections:

$$I = \frac{wo^3 \cdot ho}{12} - \frac{wi^3 \cdot hi}{12}. \tag{11}$$

The mass per unit length $\mu$ of the cavity 602 and point mass at the end of the cavity M is calculated using the inner and outer heights and widths hi, ho, wi, wo, as shown in equations (12) and (13):

$$\mu = Dp \cdot (ho \cdot wo - hi \cdot wi) + Dm \cdot (hi \cdot wi). \tag{12}$$

$$M = Dp \cdot T \cdot ho \cdot wo \tag{13}$$

Using equations (12) and (13), the cross-sectional moment of inertia I may be determined for a rectangular cross-section. By way of illustration, in an exemplary embodiment, the pipe 610 may have an inner width wi that is 1.5 inches and an inner height hi that is 3 inches. The pipe 610 may have a thickness of 0.1 inches. Using these values, the cross-sectional moment of inertia I for the pipe 610 may be determined using equation (11), which is illustrated in the following calculation (14):

$$I = \frac{1.7^3 \cdot 3.2}{12} - \frac{1.5^3 \cdot 3}{12} = 0.4664 \text{ in}^4. \quad (14)$$

Using the determined cross-sectional moment of inertia I for the rectangular cross section, other parameters, such as the mass per unit length $\mu$ of the cavity 602 when filled with water or air, as well as the point mass M at the end of the cavity 602, can be calculated as shown in the following calculations (15)-(17):

$$\text{Water } \mu = 0.289 \cdot (3.2 \cdot 1.7 - 3 \cdot 1.5) + 0.03613 \cdot (3 \cdot 1.5) = 0.434 \text{ lb/in} \quad (15)$$

$$\text{Air } \mu = 0.289 \cdot (3.2 \cdot 1.7 - 3 \cdot 1.5) = 0.272 \text{ lb/in} \quad (16)$$

$$M = 0.289 \cdot 0.1 \cdot 3.2 \cdot 1.7 = 0.157 \text{ lb} \quad (17)$$

Using the values determined by calculations (15)-(17), the natural frequency of the vibratory cavity density meter 600 can be determined when the cavity 602 is filled with air or water, as is shown in the following calculations (18) and (19):

$$\text{Air } f = \frac{1}{2\pi} \sqrt{\frac{3 \cdot 10810464000 \cdot 0.4664}{(0.2235 \cdot 0.272 + 0.157) \cdot 6^3}} = 1843.8 \text{ Hz} \quad (18)$$

$$\text{Water } f = \frac{1}{2\pi} \sqrt{\frac{3 \cdot 10810464000 \cdot 0.499}{(0.2235 \cdot 0.356 \cdot 6 + 0.1396) \cdot 6^3}} = 1549.3 \text{ Hz}. \quad (19)$$

As can be appreciated, the natural frequency and the property of the material, such as density, may be correlated. The system described with reference to FIG. 7 illustrates how such a correlation may be made.

Figure 7:
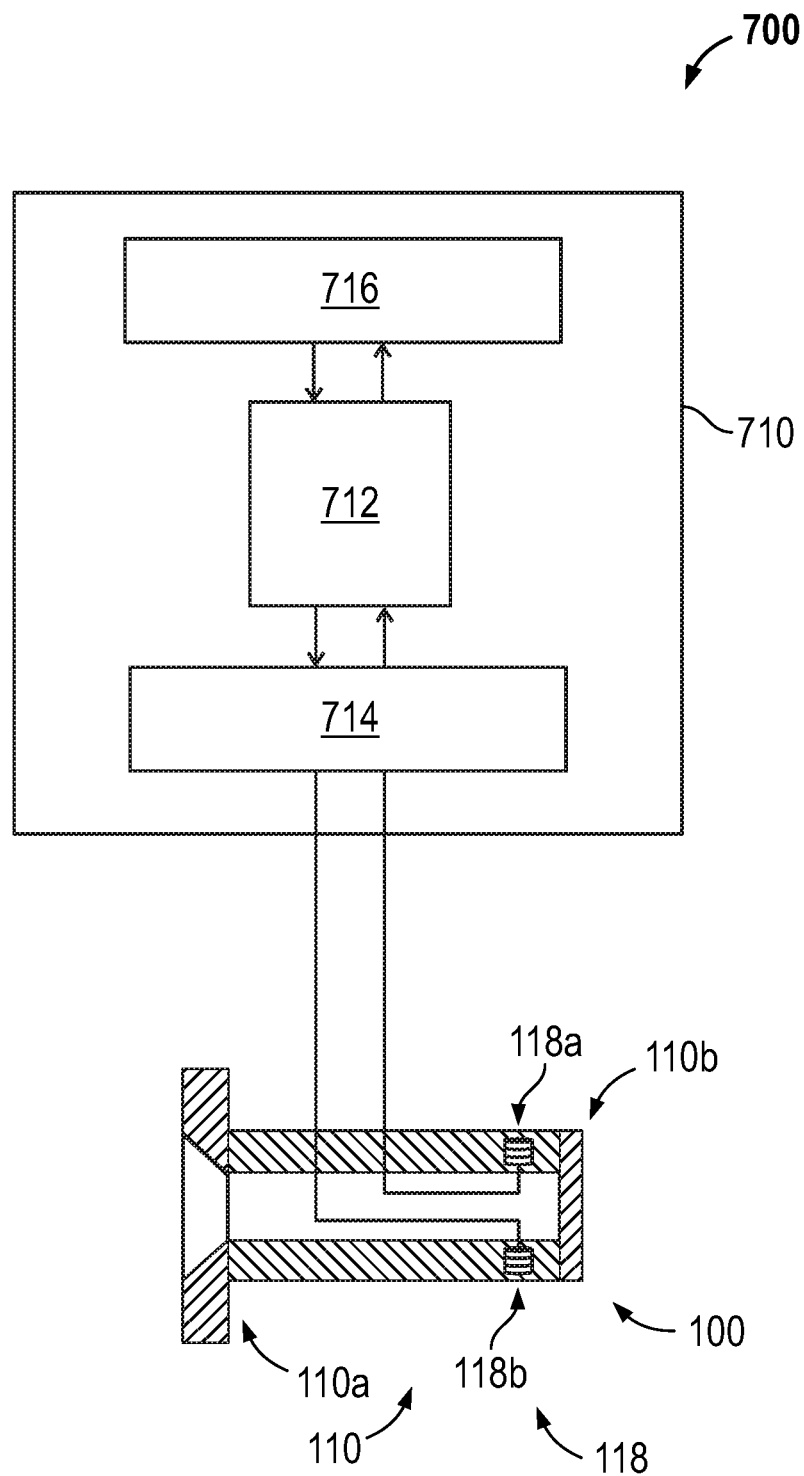
FIG. 7 shows a system 700 with the vibratory cavity density meter 100 described in the foregoing with reference to FIGS. 1-1B.

FIG. 7 shows a system 700 with the vibratory cavity density meter 100 described in the foregoing with reference to FIGS. 1-1B. Although the vibratory cavity density meter 100 described with reference to FIG. 1 is employed, any suitable vibratory cavity meter may be employed in alternative embodiments. The vibratory cavity density meter 100 includes the pipe 110, which has a first end 110a configured to couple to a container, such as the container 10 shown in FIG. 1. The pipe 110 also has a second end 110b, which is self-enclosed so as to contain material therein. As shown in FIG. 7, the system 700 includes a meter electronics 710 communicatively coupled to the at least one transducer 118 in the vibratory cavity density meter 100. More specifically, the meter electronics 710 is communicatively coupled to the driver 118a and the sensor 118b, which are proximate the second end 110b of the pipe 110.

The meter electronics 710 provides a drive signal to the driver 118a. A sensor signal is provide by the sensor 118b to the meter electronics 710. The sensor signal provided to the meter electronics 710 may include a vibration frequency of the pipe 110. The meter electronics 710 includes a processor 712 communicatively coupled to one or more signal processors 714 and one or more memories 716. The processor 712 may be a microprocessor although any suitable processor may be employed. For example, the processor 712 may be comprised of sub-processors, such as a multi-core processor, serial communication ports, peripheral interfaces (e.g., serial peripheral interface), on-chip memory, I/O ports, and/or the like. In these and other embodiments, the processor 712 is configured to perform operations on received and processed signals, such as digitized signals.

The processor 712 may receive digitized sensor signals from the one or more signal processors 714. The processor 712 is also configured to provide information, such as a vibration frequency, a property of a material in the pipe 110, or the like. The processor 712 may provide the information to the host through a communication port (not shown). The processor 712 may also be configured to communicate with the one or more memories 716 to receive and/or store information in the one or more memories 716. For example, the processor 712 may receive calibration data for, for example, a calibrated linearization around a natural frequency from the one or more memories 716. The processor 712 may use the calibration factors to process digitized sensor signals received from the one or more signal processors 714.

The one or more signal processors 714 may condition analog signals, digitize the conditioned analog signals, and/or provide the digitized signals. In an embodiment, the one or more signal processors 714 may be comprised of a CODEC that receives and encodes the sensor signal from the sensor 118b. The one or more signal processors 714 may also include a drive circuit configured to receive a frequency from the processor 712 and provide a drive signal to the driver 118a that includes a signal at the frequency provided by the processor 712. Accordingly, the signal processor may adjust the frequency of the provided drive signal until, for example, the sensor signal is at a maximum. The frequency of the sensor and/or drive signal may be stored in the one or more memories 716.

The one or more memories 716 may be comprised of a read-only memory (ROM), random access memory (RAM), ferroelectric random-access memory (FRAM), etc. However, in alternative embodiments, the one or more memories 716 may be comprised of more or fewer memories. Additionally or alternatively, the one or more memories 716 may be comprised of different types of memory (e.g., volatile, non-volatile, etc.). For example, a different type of non-volatile memory, such as, for example, erasable programmable read only memory (EPROM), or the like, may be employed instead of the FRAM.

Figure 8:
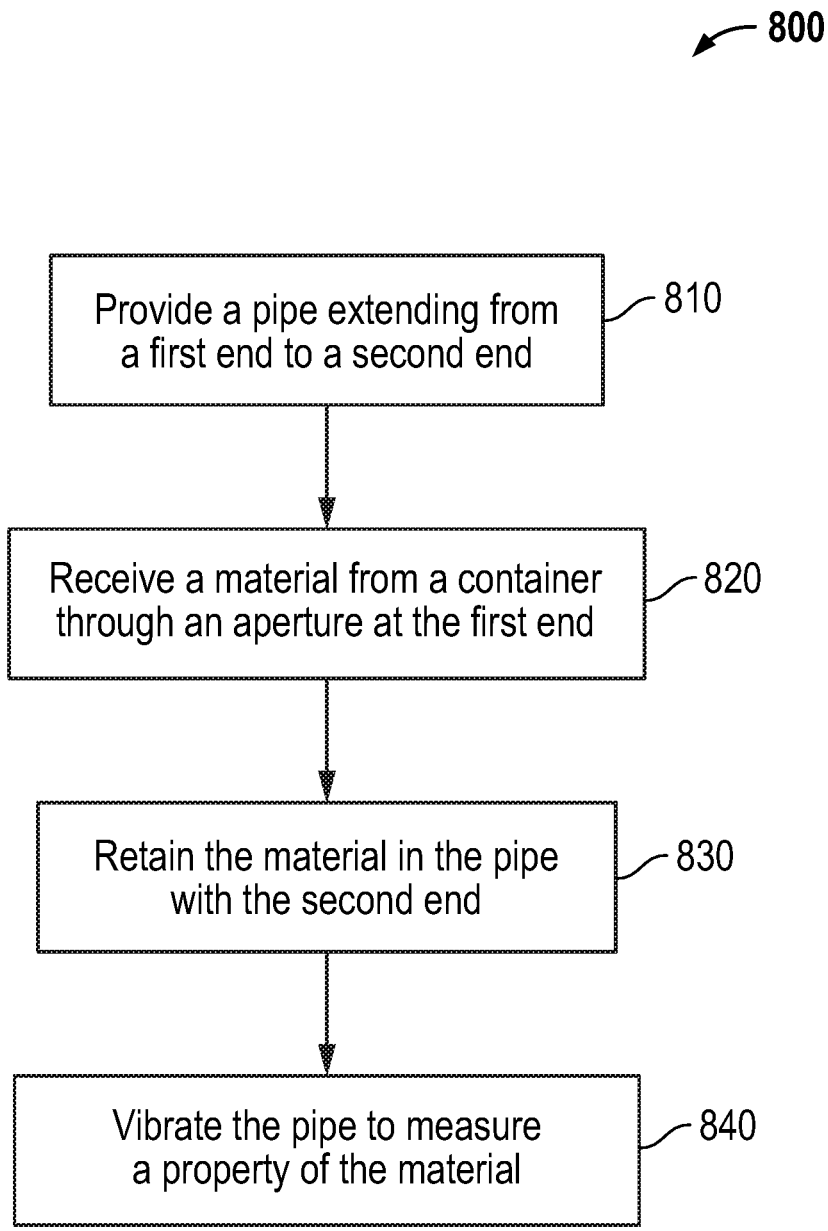
FIG. 8 shows a method 800 of operating a vibratory cavity density meter according to an embodiment.

As can be appreciated, the meter electronics 710 shown in FIG. 7 can be used to execute methods of operating the vibratory cavity density meter 100, or other vibratory cavity density meters, as the following discussion with reference to FIG. 8 illustrates.

FIG. 8 shows a method 800 of operating a vibratory cavity density meter according to an embodiment. As shown in FIG. 8, the method 800 includes a step 810 of providing a pipe extending from a first end to a second end. The pipe may be the pipe 110 described in the foregoing with reference to FIG. 1. In step 820, the method 800 receives a material from a container through an aperture at the first end. The material is retained in the pipe with the second end in step 830. In step 840, the pipe is vibrated to measure a property of the material.

In step 810, the pipe may be provided in various ways. For example, with reference to FIG. 1, the pipe 110 may be coupled to the container 10 such that the pipe 110 extends from the container 10, which includes the material. Accordingly, the pipe used in method 800 may only have a single cavity. Alternatively, more than one pipe, such as the first and second pipe 210, 220 shown in FIG. 2, may be employed. The pipe can have different shapes, such as different cross-sectional shapes. For example, the pipe 610 with the rectangular cross-section may be employed.

In step 820, the material may be received from a container through an aperture at the first end into the pipe. For example, with reference to FIG. 1, the material may be received through the aperture 114 into the pipe 110 until the pipe 110 is filled with the material. Receiving the material through the aperture 114 may include flowing the fluid through the aperture 114 into the cavity 102 formed by the conduit 112 and the end cap 116. The material may be comprised of a single component, multiple components, such as, for example, multi-phase fluids, which can include gas, liquids, and/or solids.

In step 830, the material is retained in the pipe with the second end. For example, with reference to the pipe 110 shown in FIG. 1, the pipe 110 may be self-enclosed at the second end 110*b* such that, when the material flows into the conduit 112, the material is retained by the end cap 116. Accordingly, the material in the conduit 112 may be substantially stationary and static. In another embodiment, such as the vibratory cavity density meter 300 shown in FIG. 3, the material may be retained by allowing other components that are not the material to be measured to flow out of the pipe 310. For example, air bubbles, which may be in the material being retained in the pipe 310, may flow out of the pipe 310 due to a slope of the cavity 302.

In step 840, the pipe is vibrated to measure a property, such as density, of the material. Vibrating the pipe to measure the property may include vibrating the pipe at a resonance frequency and measuring the resonance frequency. For example, the vibratory cavity density meter 100 shown in FIG. 1 may be vibrated at increasing and/or decreasing frequencies (e.g., swept over a frequency range) until a maximum frequency is obtained. The maximum frequency may be the natural frequency f of the vibratory cavity density meter 100. The natural frequency f may be correlated with the density of the material, as the foregoing discussion of equations (1)-(4) illustrates. Alternative methods may be employed to measure the property of the material.

The embodiments described above provide the vibratory cavity density meter 100-300. The vibratory cavity density meter 100-300 includes the pipe 110-310 that extends from the first end 110*a*-310*a* and the second end 110*b*-310*b*. The pipe 110-310 is configured to vibrate at the natural frequency f of the pipe 110-310 and the material retained in the pipe 110-310. The natural frequency f is correlated to a fluid property, such as density, of the material retained in the pipe 110-310. The material may be provided to the pipe 110-310 by the container 10. The material may or may not be flowing through the container 10. In addition, the cavity 102-302 may include the slope to ensure that measurements may be made of the material to be measured without, for example, air bubbles. The slope of the cavity 102-302 may also allow the material to flow out of the cavity 102-302 in a relatively short amount of time.

Accordingly, the property of the material retained by the pipe 110-310 may be measured without bypassing the container 10, unlike a tube density meter used outside its designated size range. As a result, the vibratory cavity density meter 100-300 designed to measure a material may be employed with a wide variety of containers 10 having different sizes and configurations and with or without fluid flow. In addition, the vibratory cavity density meter 100-300 may be more sensitive than, for example, the fork meter immersed in fluid. The vibratory cavity density meter 100-300 also does not need to be inserted into the fluid, allowing more design freedom for the container 10. The vibratory cavity density meter 100-300 may also be less sensitive to unstable process conditions, in contrast to the fork meter.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other vibratory cavity density meters and not just to the embodiments described above and shown in the accompanying figures. Accordingly, the scope of the embodiments described above should be determined from the following claims.

We claim:

1. A vibratory cavity density meter (100-300) comprising:
   a pipe (110-310) extending from a first end (110*a*-310*a*) to a second end (110*b*-310*b*), wherein:
   the first end (110-310) is configured to couple to a container (10) and includes an aperture (114-314) configured to receive a material from the container (10); and
   the second end (110*b*-310*b*) is self-enclosed so as to contain and prevent a flow of the material through the pipe (110*a*-310*a*); and
   at least one transducer (118, 218) coupled to the pipe (110-310), the at least one transducer (118, 218) configured to one of induce and sense a vibration in the pipe (110-310) to measure a density of the material.

2. The vibratory cavity density meter (100-300) of claim 1, wherein the pipe (110-310) extends from the container (10) in a cantilever configuration such that the first end (110*a*-310*a*) is vibrationally fixed and the second end (110*b*-310*b*) is vibrationally free.

3. The vibratory cavity density meter (100-300) of one of claim 1, wherein the at least one transducer (118, 218) is disposed proximate to the second end (110*b*-310*b*).

4. The vibratory cavity density meter (100-300) of claim 1, further comprising an encapsulating tube (20) wherein the at least one transducer (118) is disposed between and coupled to the pipe (110, 310) and the encapsulating tube (20).

5. The vibratory cavity density meter (200) of claim 1, further comprising a second pipe (220), wherein the at least one transducer (218) is disposed between and coupled to the pipe (210) and the second pipe (220).

6. The vibratory cavity density meter (100-300) of claim 1, further comprising a base (130, 230) disposed between and coupled to the container (10) and the pipe (110-310).

7. The vibratory cavity density meter (300) of claim 1, further comprising a cavity (302) formed in the pipe (310), wherein the cavity (302) includes a slope configured to drain the material into the container (10).

8. A method of operating a vibratory cavity density meter, the method comprising:
    providing a pipe extending from a first end to a second end, wherein the first end is configured to couple to a container;
    receiving a material from the container through an aperture at the first end;
    retaining the material in the pipe with the second end, the second end being self-enclosed so as to prevent a flow of the material through the pipe; and
    vibrating the pipe to measure a density of the material.

9. The method of claim 8, wherein providing the pipe extending from the first end to the second end comprises providing the pipe in a cantilever configuration such that the first end is vibrationally fixed and the second end is vibrationally free.

10. The method of claim 8, wherein vibrating the pipe to measure the property of the material comprises vibrating the second end of the pipe with at least one transducer disposed proximate the second end of the pipe.

11. The method of claim 8, wherein vibrating the pipe to measure the property of the material comprises vibrating the pipe with at least one transducer disposed between and coupled to the pipe and an encapsulating tube.

12. The method of claim 8, further comprising providing a second pipe, and disposing at least one transducer between the pipe and the second pipe.

13. The method of claim 8, further comprising disposing a base between and coupled to the container and the pipe.

14. The method of claim 8, further comprising forming a cavity in the pipe, wherein the cavity includes a slope configured to drain the material into the container.

15. A system (700) comprising:
    a vibratory cavity density meter (100-300) comprised of a pipe (110-310) extending from a first end (110a-310a) to a second end (110b-310b), wherein:
        the first end (110a-310a) is configured to couple to a container (10) and includes an aperture (114-214) configured to receive a material from the container (10); and
        the second end (110b-310b) is self-enclosed so as to contain and prevent a flow of the material through the pipe (110-310); and
    a meter electronics (710) communicatively coupled to the vibratory cavity density meter (100-300), the meter electronics (710) being configured to vibrate the pipe (110-310) to measure a density of the material.

* * * * *

UNITED STATES PATENT AND TRADEMARK OFFICE
CERTIFICATE OF CORRECTION

PATENT NO. : 10,866,178 B2
APPLICATION NO. : 16/303480
DATED : December 15, 2020
INVENTOR(S) : Andrew S. Kravitz et al.

It is certified that error appears in the above-identified patent and that said Letters Patent is hereby corrected as shown below:

In the Specification

Column 6, Lines 38 to 39, formula (1) should appear as follows:

$$f = \frac{1}{2\pi} \sqrt{\frac{3 \cdot E \cdot I}{(0.2235 \cdot \mu \cdot L + M) \cdot L^3}}$$

Column 7, Lines 44 to 46, formula (7) should appear as follows:
*Water* $\mu =$
$0.289 \cdot \pi \cdot (1.1875^2 + 1.0785^2) + 0.03613 \cdot \pi \cdot (1.0875^2) = 0.356$ *lb/in*

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*